(12) United States Patent
Van Wonterghem

(10) Patent No.: US 6,735,301 B2
(45) Date of Patent: May 11, 2004

(54) METHOD AND DEVICE FOR DISTRIBUTING ELECTRIC POWER IN TELECOMMUNICATION CENTRAL OFFICE EQUIPMENT

(75) Inventor: Geert Arthur Edith Van Wonterghem, Eeklo (BE)

(73) Assignee: Alcatel, Paris (FR)

( * ) Notice: Subject to any disclaimer, the term of this patent is extended or adjusted under 35 U.S.C. 154(b) by 185 days.

(21) Appl. No.: 09/793,120

(22) Filed: Feb. 27, 2001

(65) Prior Publication Data

US 2002/0126829 A1 Sep. 12, 2002

(30) Foreign Application Priority Data

Feb. 29, 2000 (EP) .............................. 00400549

(51) Int. Cl.⁷ ................................. H04M 3/00
(52) U.S. Cl. .................. 379/322; 379/324; 379/413
(58) Field of Search ................... 379/413, 324, 379/322; 320/128, 133; 323/281, 282; 363/74, 64, 66

(56) References Cited

U.S. PATENT DOCUMENTS

| 5,003,451 | A | * | 3/1991 | Gradl et al. ............. 363/56.01 |
| 5,008,796 | A | * | 4/1991 | Johnson .................... 363/21.16 |
| 5,266,884 | A | * | 11/1993 | Agiman ....................... 323/284 |
| 5,440,441 | A | | 8/1995 | Ahuja |
| 5,513,059 | A | | 4/1996 | Atkins |
| 5,587,924 | A | * | 12/1996 | Rossi .......................... 702/63 |
| 5,714,872 | A | | 2/1998 | Heimerl et al. |
| 5,721,483 | A | * | 2/1998 | Kolluri et al. .............. 323/224 |
| 5,726,849 | A | * | 3/1998 | Nakamura .................. 361/93.5 |
| 5,926,384 | A | * | 7/1999 | Jochum et al. .......... 363/56.05 |
| 5,945,806 | A | * | 8/1999 | Faulk ........................ 320/127 |
| 5,986,434 | A | * | 11/1999 | Roy et al. ................... 320/128 |
| 6,133,772 | A | * | 10/2000 | Drapkin et al. ............. 327/206 |
| 6,232,752 | B1 | * | 5/2001 | Bissell ........................ 323/225 |
| 6,359,426 | B1 | * | 3/2002 | Sarles et al. ................ 323/281 |

FOREIGN PATENT DOCUMENTS

EP 0 932 237 A2 7/1999

* cited by examiner

Primary Examiner—Huyen Le
Assistant Examiner—Barry W Taylor
(74) Attorney, Agent, or Firm—Sughrue Mion, PLLC

(57) ABSTRACT

The invention relates to a method for distributing electric power in telecommunication central office equipment intended to operate at voltages within a determined range, according to which method the voltage of the distributed power is allowed to drop temporarily below the lowest voltage of the range.

22 Claims, 1 Drawing Sheet

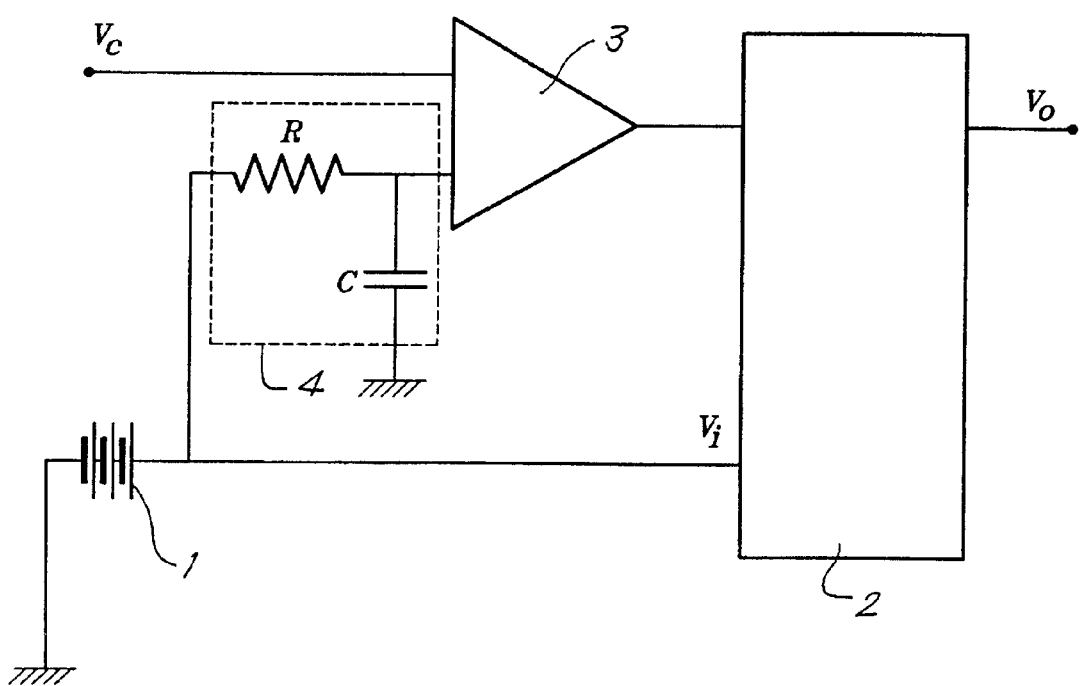

METHOD AND DEVICE FOR DISTRIBUTING ELECTRIC POWER IN TELECOMMUNICATION CENTRAL OFFICE EQUIPMENT

This invention relates to a method for distributing electric power in telecommunication central office equipment intended to operate at voltages within a determined range.

SUMMARY OF THE INVENTION

As the equipment operates continuously correctly only when the input voltage is situated within a limited range around a nominal voltage, the power is distributed in such way that the voltage is situated within a determined range.

For the power distribution of a telephone network, the reference voltage is for instance 48 V and said range from 38 V to 56 V.

Telecommunication standards, for example ETSI (European Telecommunications Standard Institute) and BELCORE standards, require that the equipment should keep operating normally when the input voltage, for example the DC voltage from a battery or a rectifier, drops temporarily below the lower limit of this range.

Such voltage drop can take place when the power is switched, for instance by means of relays, from one power supply to another. The duration of such input voltage drop can vary between 0 and 30 ms.

In order to avoid that the distribution is cut off during a short voltage drop, capacitors are used which keep the voltage constant, and thus above the lowest voltage of said voltage range, during the input voltage drop.

BACKGROUND OF THE INVENTION

These big capacitors are costly and voluminous. The distribution racks used for distributing are consequently relatively big and expensive. Extra sub-racks may be required for the big capacitors.

The aim of the invention is to obviate this drawback and to offer a method for power distribution, avoiding the use of big capacitors and permitting to use a relatively economic and compact equipment for the distribution.

In accordance with the invention, this object is accomplished in a method for distributing power according to which the voltage of the distributed power is allowed to drop below the lowest voltage of the range, but only temporarily.

This is completely against the general idea that the voltage may never drop below the lower limit of the prescribed range.

Unexpectedly, it was found that such voltage drop is permissible during a short time and for instance for the duration of the above mentioned input voltage drop which the prior art methods compensate with capacitors.

Preferably, according to the invention, the voltage of the distributed power is allowed to drop below this lowest voltage during the complete duration of said input voltage drop, this is thus in practice during 0 ms to 30 ms.

The invention also relates to a device for distributing electric power in telecommunication central office equipment intended to operate at voltages within a determined range, particularly suited for the application of the above described method of the invention.

The device is characterised in that it comprises means for allowing the voltage of the distributed power to drop temporarily below the lowest voltage of the range.

BRIEF DESCRIPTION OF THE DRAWINGS

The invention will now be described by way of example and with reference to the accompanying drawing.

In central office telecommunication equipment, power distribution racks distribute the power from one or more batteries 1 or a rectifier to further circuits.

DETAILED DESCRIPTION OF THE INVENTION

Part of the power distribution system is constituted by equipment 2, for instance a DC/DC converter, which normally operates continuously within a predetermined range, whereby the batteries 1 or rectifier have a nominal voltage situated in this range.

Therefore, the power from a battery 1 or a rectifier is provided to the equipment 2 in such way that the supplied voltage Vo normally remains within the above-mentioned range.

If the voltage of the distributed power rises above the upper limit of the range, it may be limited with for example a Zener-diode.

When the voltage of the battery, is continuously under the lower limit voltage, the equipment 2 does not have to work and, in fact, it is advisable that the equipment 2 should not operate as the used power is constant, but the voltage is lower, what means that the current is higher.

Such higher current influences the dimensioning of the distribution equipment 2 and the fuses.

Consequently, if the voltage input descends during a long time under the lower limit of the range, the power distribution is cut-off.

Therefore, the input voltage $V_i$ is continuously compared with a comparison voltage $V_c$ corresponding to said lower limit and the equipment is triggered in function of the result of this comparison.

As shown in the accompanying drawing, an electronic comparator 3 may be used for this comparison, the input voltage $V_i$ being supplied to one entry of it, the other entry being connected to a comparison voltage input $V_c$.

The output of the comparator 3 is a trigger signal sent to the equipment 2.

While it should be avoided that the output voltage $V_o$ of the power distribution is continuously beneath the lower limit of above-mentioned range, a temporary drop under this limit is however permitted.

This temporary drop may have a duration about equal of the duration of the input voltage drop caused by for instance relays that are switching from one power supply to another, for instance from one battery 1 to another, which duration is for example from 0 ms to 30 ms.

In order to permit this temporary drop, the input from the battery 1 to the comparator 3 is delayed by means of a delay circuit 4.

As shown in the drawing, the delay circuit 4 can be implemented as a R-C circuit, comprising a resistor R in series with the input voltage $V_i$ and thus connected to an entry of the comparator 3, and a capacitor C in parallel with this input.

This capacitor C may be very small, for example have a capacitance of 1 $\mu$F. Therefore it is relatively inexpensive and needs relatively little space and volume compared to the big capacitors used with the prior art distribution methods which use very big capacitors at the input of equipment 2.

The output voltage $V_o$ may temporarily drop to zero volt, but a lower limit underneath the lowest voltage of the operating range may be determined.

As the lower voltage and also the higher current are only temporary, there is no need to adapt the dimensioning of the equipment 2.

Hereafter a practical example is given:

A DC/DC converter, constituting the equipment 2 of a Central office Power distribution, normally operates continuously within the predetermined range from 38 V to 56 V, and is supplied by batteries 1 having a nominal voltage of 48 V.

The voltage $V_o$ of the distributed power is allowed to drop underneath the lower limit of 38 V to a lower voltage of 28 V during 2 ms, the duration of a drop of the input voltage $V_i$ due to switching between two batteries 1.

In the comparator 3, the input voltage $V_i$ is continuously compared with a comparison voltage $V_c$ of 38 V. The input from the battery 1 is fed to the comparator 3 through the delay circuit 4 having a resistor R of 10 kohm in series with the battery 1, while a capacitor C of 1 $\mu$F is connected in parallel with the input. The capacitor C needs only about 2 cm$^2$ surface and about 3 cm$^3$ volume per 20 W, what permits to distribute power more lines per distribution rack.

What is claimed is:

1. A method for distributing electric power in telecommunication central office equipment at a specified output voltage range, where a minimum input voltage level is required to maintain the distributed electric power at the specified output voltage range, the method comprises allowing an output voltage of the distributed electric power to drop temporarily below the lower limit of the output voltage range in response to an input voltage drop below the minimum input voltage level, while simultaneously continuing to distribute electric power for a predetermined amount of time, wherein the predetermined amount of time is measured from the time when the input voltage drops below the minimum input voltage level.

2. The method according to claim 1, wherein the output voltage is allowed to drop below the lower limit of the output voltage range during the complete duration of the input voltage drop.

3. The method according to claim 2, wherein the predetermined amount of time is less than or equal to 30 ms.

4. The method according to claim 1, wherein the input voltage and the output voltage are DC voltages.

5. The method according to claim 1, wherein the input voltage is compared with a comparison voltage corresponding to the lower limit of the output voltage range.

6. The method according to claim 5, wherein a comparator is used for comparing the input voltage to the comparison voltage, such that the input voltage is coupled to one input of the comparator, the comparison voltage is connected to a second input of the comparator and the output of the comparator is a trigger signal.

7. The method according to claim 6, wherein a delay circuit couples the input voltage into the comparator.

8. The method according to claim 6, wherein the trigger signal is used to shut down distribution of the electric power when the output voltage drops below the lower limit of the output voltage range for an amount of time that is greater than the predetermined amount of time.

9. A device for distributing electric power in telecommunication central office equipment at a specified output voltage range, where a minimum input voltage level is required to maintain the distributed electric power at the specified output voltage range, comprising means for allowing an output voltage of the device to drop temporarily below the lower limit of the output voltage range in response to an input voltage drop below the minimum input voltage level, while simultaneously continuing to distribute electric power for a predetermined amount of time, wherein the predetermined amount of time is measured from the time when an input voltage to the device drops below a minimum input voltage level.

10. The device according to 9, wherein the means for allowing allows the output voltage to drop below the lower limit of the output voltage range during the complete duration of the input voltage drop.

11. The device according to claim 10, wherein the predetermined amount of time is less than or equal to 30 ms.

12. The device according to claim 9, wherein the input voltage and the output voltage are DC voltages.

13. The device according to claim 9, wherein the means for allowing comprises a comparator.

14. The device according to claim 13, wherein the means for allowing further comprises a delay circuit.

15. The device according to claim 14, wherein:

the input voltage is connected in series with the delay circuit to a first input of the comparator; and a comparison voltage is connected to a second input of the comparator.

16. The device according to claim 15, wherein the delay circuit comprises:

a resistor connected in series between the input voltage and the first input of the comparator; and a capacitor connected to the first input of the comparator and a ground terminal.

17. The device according to claim 13, wherein the comparator further comprises an output terminal that outputs a trigger signal when the output voltage drops below the lower limit of the output voltage range for an amount of time that is greater than the predetermined amount of time.

18. The device according to claim 17, wherein a DC/DC converter is connected to the output terminal and the DC/DC converter shuts down when the trigger signal indicates that the output voltage has dropped below the lower limit of the output voltage range for an amount of time that is greater than the predetermined amount of time.

19. A device for distributing electric power in telecommunication central office equipment, the device having a specified output voltage range, where a minimum input voltage level is required to maintain the distributed electric power at the specified output voltage range, comprising:

a power supply that distributes electric power;

a comparison circuit connected to the power supply, wherein if an output voltage of the power supply drops below the lower limit of the output voltage range for greater than a predetermined amount of time in response to an input voltage drop below the minimum input voltage level, the comparison circuit supplies a trigger signal to prevent the power supply from continuing to distribute power;

a comparison voltage coupled to a first input of the comparison circuit; and an input voltage supply coupled to a second input of the comparison circuit and to the power supply.

20. The device according to claim 19, wherein the power supply comprises a DC-DC converter.

21. The device according to claim 19, wherein the comparison circuit comprises:

a comparator; and a delay circuit.

22. The device according to claim 19, wherein the predetermined amount of time is less than or equal to 30 ms.

* * * * *